(12) United States Patent
Snell (10) Patent No.: US 10,963,722 B2
(45) Date of Patent: Mar. 30, 2021

(54) METHOD AND APPARATUS FOR RECOGNIZING A LICENSE PLATE OF A VEHICLE

(71) Applicant: JENOPTIK Traffic Solutions UK Ltd, Camberley (GB)

(72) Inventor: Violet Snell, Petersfield (GB)

(73) Assignee: JENOPTIK Traffic Solutions UK Ltd., Camberley (GB)

( * ) Notice: Subject to any disclaimer, the term of this patent is extended or adjusted under 35 U.S.C. 154(b) by 10 days.

(21) Appl. No.: 16/524,915

(22) Filed: Jul. 29, 2019

(65) Prior Publication Data
US 2020/0034647 A1 Jan. 30, 2020

(30) Foreign Application Priority Data
Jul. 27, 2018 (EP) .................................. 18185953

(51) Int. Cl.
| G06K 9/00 | (2006.01) |
| G06K 9/32 | (2006.01) |
| G06N 3/04 | (2006.01) |
| G06N 3/08 | (2006.01) |
| G06N 5/04 | (2006.01) |

(52) U.S. Cl.
CPC ......... G06K 9/3258 (2013.01); G06N 3/0454 (2013.01); G06N 3/08 (2013.01); G06N 5/046 (2013.01); *G06K 2209/15* (2013.01)

(58) Field of Classification Search
CPC combination set(s) only.
See application file for complete search history.

(56) References Cited

U.S. PATENT DOCUMENTS 9,785,855 B2 * 10/2017 Gordo Soldevila et al. ................ G06K 9/325
382/224
2018/0101750 A1 4/2018 Soldevila
2019/0251369 A1 * 8/2019 Popov et al. ...... G06K 9/00791

FOREIGN PATENT DOCUMENTS

EP 3182334 A1 6/2017

OTHER PUBLICATIONS

Wang et al, "Towards End-to-End Car License Plates Detection and Recognition with Deep Neural Networks", IEEE Transactions on Intelligent Transportation Systems, Apr. 2, 2017, Revised Sep. 26, 2017.

(Continued)

*Primary Examiner* — Ping Y Hsieh
*Assistant Examiner* — Xiao Liu
(74) *Attorney, Agent, or Firm* — Muncy, Geissler, Olds & Lowe, P.C.

(57) ABSTRACT

An apparatus for recognizing a license plate of a vehicle, the apparatus having an interface for reading-in an image of a surrounding of an optical sensor, the image originating from the optical sensor picturing at least the vehicle having a detectable license plate. The apparatus further comprises a unit for analyzing the image using a convolutional neural network, the convolutional neural network having at least two separated symbol identification branches, each of the separated symbol identification branches being configured for identifying one of several symbols of the license plate and/or the convolutional neural network having a country identification branch being separated from the symbol identification branches, the country identification branch being configured for identifying the country having issued the license plate.

9 Claims, 3 Drawing Sheets

(56) References Cited

OTHER PUBLICATIONS

Nam et al., "Learning Multi-Domain Convolutional Neural Networks for Visual Tracking," Computer Visual Foundation, pp. 4293-4302 (2016).

* cited by examiner

METHOD AND APPARATUS FOR RECOGNIZING A LICENSE PLATE OF A VEHICLE

This nonprovisional application claims priority under 35 U.S.C. § 119(a) to European Application No. EP 18185953.9, which was filed on Jul. 27, 2018, and which is herein incorporated by reference.

BACKGROUND OF THE INVENTION

Field of the Invention

The present invention relates to a method or an apparatus for recognizing a license plate of a vehicle. The subject of the present invention is also a computer program.

Description of the Background Art

The majority of current methods for Automatic Number Plate Recognition (ANPR) consist of a pipe-line which first locates the area containing characters, then splits it into separate character boxes (the process is known as segmentation), followed by independently recognizing the letter or digit represented at each position. Some post-processing logic may then attempt to fit the results into the country's syntax rules, subject to correct identification of the country. This pipe-line is error prone at each of its stages, and the cumulative effect often results in low accuracy of recognition.

SUMMARY OF THE INVENTION

It is therefore an object of the present invention to provide a method and apparatus for recognizing a license plate for a vehicle, as well as a computer program.

Disclosed herein is a method for recognizing a license plate of a vehicle, the method comprising the following steps: reading in an image of the surroundings of an optical sensor, the image originating from the optical sensor picturing at least said vehicle having a detectable license plate; analyzing the image using a convolutional neural network, the convolutional neural network having at least two separated symbol identification branches, each of the separated symbol identification branches being configured for identifying one of several symbols of the license plate and/or the convolutional neural network having a country identification branch being separated from the symbol identification branches, the country identification branch being configured for identifying the country having issued the license plate; and outputting the at least two identified symbols and/or the identified country in order to recognize the license plate of the vehicle.

In accordance with the method disclosed herein, an image can be considered to be the output signal of a camera or an optical sensor. The symbol identification branch can be considered to be a layer or a set of layers, which are separated from another layer or a set of layers in order to identify one of several symbols of the license plate. A separation of layers or the branches can be understood such no information from one layer or branch is transferred to another layer of a different branch. A symbol can be understood in the present description to be a digit or a character or a space or at least a tax sticker, which can be part of the registration string depicted on the license plate of the vehicle. Recognizing the license plate of a vehicle therefore can be understood to be identification of the set of symbols which are depicted on the license plate of the vehicle in order to uniquely identify the vehicle. Additionally or alternatively in the step of analyzing a convolutional neural network is used, having a country identification branch being separated from the symbol identification branches, the country identification branch being configured for identifying the country having issued the license plate. Usage of a specifically configured country identification branch provides the advantage that the mostly special design of the license plate identifying a country from which the license plate originates can be used in order to facilitate the said country identification. This identification can be accomplished by an identification of special signs like a marking or a code on the license plate and/or by identifying the font, spacing and syntax of the symbols depicted on the license plate. Thus, it is possible to utilize all graphical information for identification of the respective country on the license plate, as well as any country-specific format or a country-specific number of symbols to be expected during the recognition of the license plate. Additionally, the country identification branch can be configured for identifying the country from which the license plate originates by analyzing the structure, style of the symbols of the registration code, spacing between symbols or the like in order to utilize the differences of the registration plates relating to distinct symbols and/or fonts, spacing and syntax of the symbols depicted on the license plate of the different countries to identify the country from which the license plate originates. Using a separated country identification branch also indirectly further improves the recognition of the license string of the vehicle.

The present invention is based on the finding that using a convolutional neural network directly on the entire image which originates from the optical sensor significantly improves the quality and the speed of the recognition of a license plate of the vehicle. Especially using at least two separated symbol identification branches for identifying one of several symbols of the license plate provides a high flexibility in recognition of different license plates, without being constrained by a pre-segmentation of an area in the image which is identified to comprise an image of a license plate. Thus, using the methods disclosed herein provides the advantage of omitting the pre-identification of the precise location of a license plate in the image as well as a pre-segmentation of this area in the image for identifying different numbers or digits in the segments, which in turn facilitates a pre-processing of the image in order to recognize the license plate of the vehicle. Rather, it is only necessary to feed the image of approximate neighborhood of the license plate (or similar) into the trained convolutional neural network which then provides the at least two identified symbols in order to recognize the license plate of the vehicle.

According to an exemplary embodiment of the present invention, in the step of analyzing a convolutional neural network is used, having at least a fully-connected layer in the symbol identification branches. In a fully connected layer, every neuron in one layer is connected to every neuron in another layer. Such an embodiment of the present invention provides the advantage that the identification of the symbols can be performed with high precision, such that for example dirt on the license plate or damage of license plate do not prevent or deter the methods disclosed herein from identifying the correct symbol at the respective position.

Furthermore, in the step of analyzing, a convolutional neural network can be used, having an output layer in the symbol identification branches, the output layer having a number of neurons being equivalent to a number of identifiable distinguishable types of symbol on the license plate, especially the output layer having 37 neurons. The identifiable symbols can for example be digits, a space symbol or characters of the alphabet, which may be depicted on the license plate in order to form the unique registration string or symbol sequence on the license plate to identify the respective vehicle. Especially, 10 digits, the space symbol and 26 alphabetical characters can form the basis of the registration string of the license plate such that identifying in 37 symbols is sufficient in most countries with the Western alphabet.

In the step of analyzing, a convolutional neural network can be used, having the fully-connected layer as an input to the output layer in the symbol identification branches. Especially the combination of the fully-connected layer as input to the output layer having a number of neurons being equivalent to a number of identifiable symbols on the license plate provides a high flexibility as well as a high preciseness of identifying the correct symbol in each of the symbol identification branches.

In the step of analyzing, a convolutional neural network can be used having at least three separated symbol identification branches, each of the separated symbol identification branches being configured for identifying one of several symbols of the license plate, and in the step of outputting the at least three identified symbols are outputted in order to recognize the license plate of the vehicle. In order to provide a one-step identification or recognition of the license plate, more than two separated symbol identification branches can be used, as for example at least three separated symbol identification branches. To be more specific, if the convolutional neural network is trained on license plates for specific countries such that it is known how many positions a registration string or a unique symbol sequence on the license plate can have, the respective number of separated symbol identification branches can be used in the convolutional neural network. Furthermore, the neural network can also be configured to output a space symbol to accomplish padding, if the license plate shown in the image does not have the full amount of symbols which can be used for license plates in the respective countries for which license plates shall be recognized.

In the step of analyzing, a convolutional neural network can be used, having at least one shared fully-connected layer as input to the separated symbol identification branches and/or the country identification branch. Such an embodiment of the present invention provides the advantage that information that is relevant to all positions, and therefore all branches, can be collated from all spatial locations within the convolutional layers and additionally processed in a holistic manner. It allows a manner of information exchange between branches by providing them with a shared input whose composition is affected by all of them during training.

In order to provide sufficient information for identification or recognition of license plates in the convolutional neural network, an advantageous embodiment of the present invention can be used, in which in the step of analyzing a convolutional neural network is used, having a plurality of convolutional layers. The convolutional neural network especially can have three to twenty, preferably five convolutional layers. The plurality of convolutional layers can be used for processing the image in order to obtain processed information, wherein the convolutional neural network is furthermore configured to feed the processed information into the separated symbol identification branches and/or the country identification branch. Such an embodiment of the present invention provides the advantage of a sufficient preciseness of the identification of the symbols at a variety of different sizes, while restricting the computational cost of both training and deployment.

In order to accomplish the advantages as described above, the convolution neural network should to be trained prior to the feeding with the image. This training can for example be carried out in a laboratory environment, using pre-recorded images of vehicles having respective detectable license plates. Therefore, according to another embodiment of the present invention, a method for Training a convolutional neural network to be used in a method for recognizing a license plate of a vehicle is disclosed, the method comprising the following steps: reading in a image of a surrounding of an optical sensor, the image originating from the optical sensor picturing at least the vehicle having a detectable license plate; providing a convolutional neural network, the convolutional neural network having at least two separated symbol identification branches, each of the separated symbol identification branches being configured for identifying one of several symbols of the license plate and/or the convolutional neural network having a country identification branch being separated from the symbol identification branches, the country identification branch being configured for identifying the country having issued the license plate; and training the convolutional neural network using the image read in.

The method disclosed herein can be implemented, for example, in software or hardware or in a mixed form of software and hardware, for example in a control unit.

The approach presented here also provides a device or an apparatus that is designed to perform, control and/or implement the steps of a variant of a method presented here in corresponding facilities or units. Also by this embodiment of the invention in the form of a device, the object underlying the invention can be solved quickly and efficiently.

For this purpose, the device can have at least one arithmetic unit for processing signals or data, at least one memory unit for storing signals or data, at least one interface to a sensor or an actuator for reading sensor signals from the sensor or for outputting data or control signals to the sensor, actuator and/or at least one communication interface for reading or outputting data embedded in a communication protocol. The arithmetic unit may be, for example, a signal processor, a microcontroller or the like, wherein the memory unit may be a flash memory, an EEPROM or a magnetic memory unit. The communication interface can be configured to read or output data wirelessly and/or by cable, wherein a communication interface that can read or output line-bound data, for example, electrically or optically read this data from a corresponding data transmission line or output in a corresponding data transmission line.

In the present case, a device can be understood as meaning an electrical device which processes sensor signals and outputs control and/or data signals in dependence thereon. The device may have an interface, which may be formed in hardware and/or software. In the case of a hardware-based embodiment, the interfaces can be part of a so-called system ASIC, for example, which contains a wide variety of functions of the device. However, it is also possible that the interfaces are their own integrated circuits or at least partially is formed of discrete components. In a software embodiment, the interfaces may be software modules, which are present for example on a microcontroller in addition to other software modules. Apparatus being configured for controlling and/or performing the steps of one of the methods according to one of the preceding claims in respective units of the apparatus.

Also provided is a computer program product or computer readable media or a computer program with program code which can be stored on a machine-readable carrier or storage medium such as a semiconductor memory, a hard disk memory or an optical memory and for carrying out, implementing and/or controlling the steps of one of the methods according to one of the embodiments described above is used, especially when the program product or program is executed on a computer or a device.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
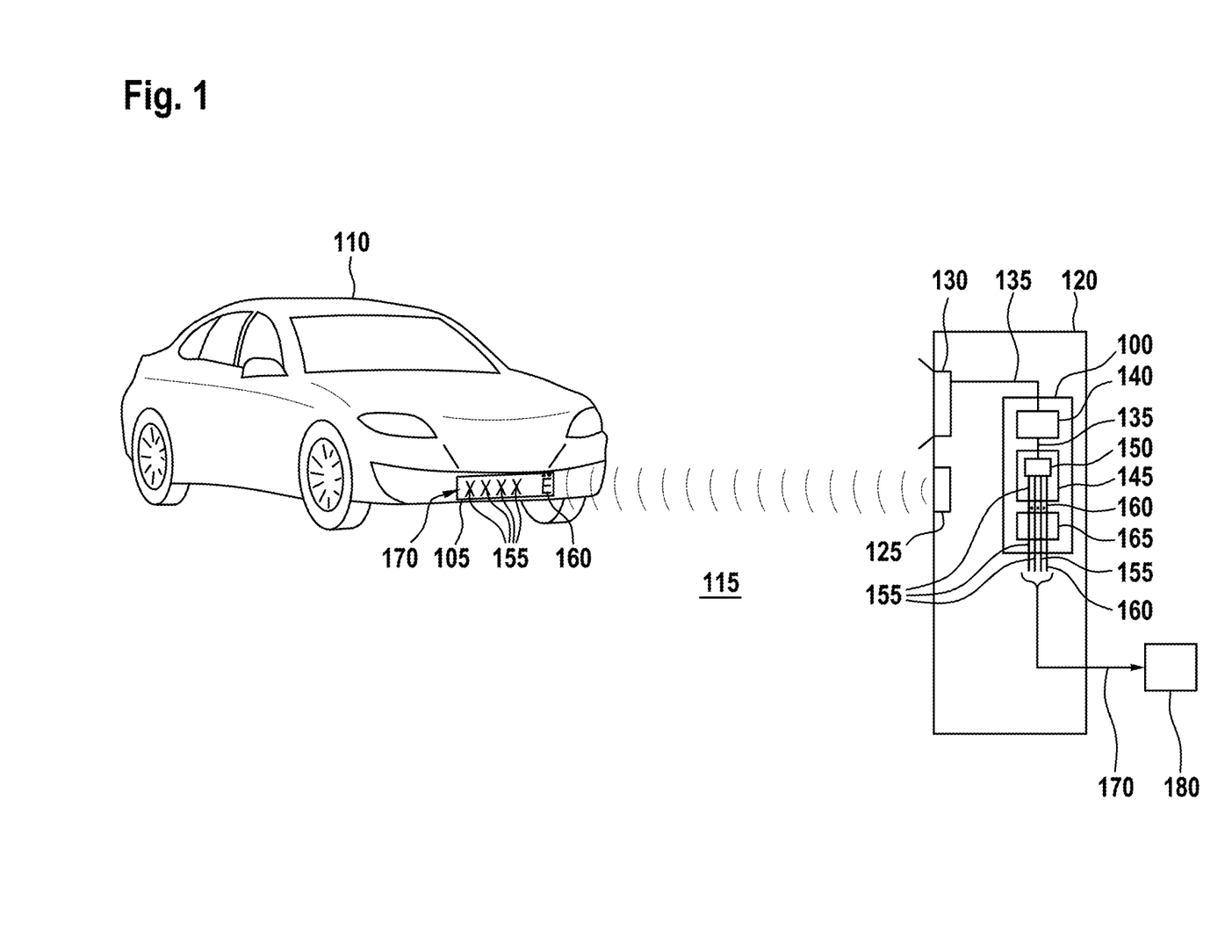
FIG. 1 is a schematic of a scenario in which an embodiment of the present invention as an apparatus for recognizing a license plate of a vehicle is utilized.

FIG. 1 shows a schematic of a scenario in which an embodiment of the present invention as an apparatus 100 for recognizing a license plate 105 of a vehicle 110 is utilized. The vehicle 110 is for example driving on a road 115, next to which a control pillar 120 is placed, for example (but not mandatory) in order to measure the velocity of the vehicle 110 by means of a radar sensor 125 or to check, whether for the vehicle 110 the specific amount of required road charge has been paid or is to pay. However, the vehicle 110 is shown in the embodiment according to FIG. 1 as a passenger car which is not mandatory such that the vehicle 110 can also be a truck, bus, a motorcycle or the like which all have a unique license plate 105 on the front or at least on the rear. In order to identify the vehicle 110 by means of an automatic recognition of the license plate 105, either in the case of issuing a ticket for violating speed limits or for payment of the required road charges the control pillar 120 comprises a camera 130 (which can also be denoted as a optical sensor) which captures an image 135 of a surrounding of the camera 130 in which, for example, the vehicle 110 is driving on the road 115. Furthermore, under normal conditions, the license plate 105 is also detectable, which is necessary according to legal regulations concerning the traffic in most countries.

The image 135, captured by the camera 130 is then forwarded to a reading-in-interface 140 of the apparatus 100 for recognizing the license plate 105 of the vehicle 110. From this reading-in-interface 140 the image 135 is transferred to a unit 145 for analyzing (i.e., analyzing unit), in which the image 135 is fed into a convolutional neural network 150, which is explained in more detail in a subsequent section of this description. The convolutional neural network 150 is configured for identifying symbols 155 and/or the country 160 in which the vehicle 110 is licensed. Thus, the convolutional neural network 150 is configured for outputting parameters for the identified symbols 155 and/or the issuing country 160, which are referenced in the block representing the convolutional neural network 150 on the right-hand side of FIG. 1 just with the reference numerals for the symbols 155. These parameters identifying the symbols 155 and the issuing country 160 are then output from the unit 145 for analyzing to a output unit 165, which then is for example but not mandatorily configured for combining the individual symbols 155 and/or a code representing the country 160 in which the vehicle 110 is licensed, such that the complete registration string 170 (or symbol string) on the license plate 105 is recognized. The registration string 170, which is written on the plate, can then be transferred downstream together with information about the identified country, which is not necessarily part of the registration string. This registration string 170 or symbol string on the license plate 105 is then for example stored or transferred to a separate unit 180, in which for example an identification of the owner or registered keeper of the vehicle is performed, in order to deliver the ticket for violating the speed limit or in order to collect the required road charges from the respective person.

In addition, the sliding window method is very slow, and requires training data with not only labels of correct registration string, but also labeled position for each character, in order to train the single-character classifier. Modeling the sequence with a generative hidden Markov model (HMM) and selecting the best code with a Naïve Bayes classifier is significantly less accurate than a discriminatively trained neural net. The language model embodied by the HMM has to be adapted to each state's distribution of syntax patterns. Only syntax is taken into account when attempting to determine issuing state.

Thus, starting from images captured by a traffic monitoring camera which show a cropped region around a vehicle's 110 license plate 105, the aim of the present approach can be quoted for example to determine the sequence of letters and digits (symbols 155) which constitutes the registration string 170. By usage of the approach disclosed here it is possible to improve the recognition accuracy in the presence of variations in size and position of the plate within the crop, its rotation/skew, contrast, focus, as well as dirt, small obstructions, or damage to the physical plate. Furthermore, it is possible to determine the country of registration with high accuracy, which enables a precise recognition of the license plate conforming to the relevant jurisdiction's rules on license plate syntax when distinguishing ambiguous cases such as zero versus 'O', or one versus T. Additionally, it is also possible to fit within the limited processing power of embedded devices to allow execution in near real-time.

Figure 2:
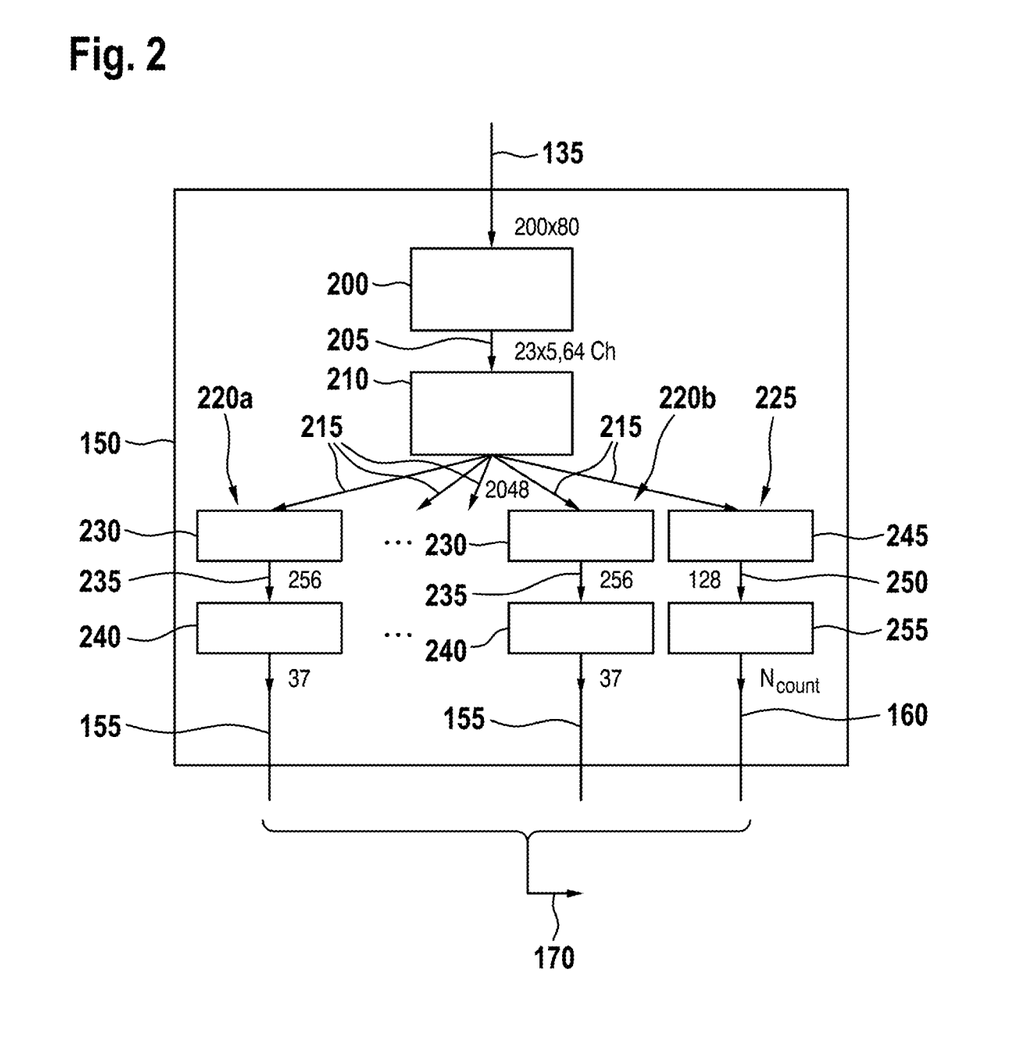
FIG. 2 is a block diagram of an example of a convolutional neural network, which can be used in the unit for analyzing according to FIG. 1.

FIG. 2 shows a block diagram of an example of a convolutional neural network 150, which can be used in the unit 145 for analyzing according to FIG. 1. As can be seen from FIG. 2 the image 135, which is for example represented by digital image data, is fed into the convolutional neuronal network 150. The image 135 can be, for example, a matrix comprising 200×80 pixels, each being captured monochromatically. The image 135 is then for example fed into a block 200 of a number of convolutional layers, with rectified-linear activations, and max pooling, followed by fully connected layers. The number of convolutional layers can for example be between 3 and 7, preferably 5, which provide a good trade-off between preciseness of the recognition of the license plate 105 and a tolerable numeric effort in order to quickly obtain respective results. For example, if the block 200 of convolutional layers comprises 5 convolutional layers the individual layers can be configured as follows:

- $1^{st}$ convolutional layer has 32 5×5 kernels, and 2×2 MaxPool
- $2^{nd}$ convolutional layer has 64 3×3 kernels, and 2×2 MaxPool
- 3rd convolutional layer has 128 3×3 kernels, and 2×2 MaxPool
- 4th convolutional layer has 512 1×1 kernels, and no MaxPool
- 5th convolutional layer has 64 1×1 kernels, and 1×2 (vertical-only) MaxPool
- the sizes for fully connected layers are indicated in the FIG. 2.

All the layers belonging to the exemplary block 200 use rectified linear activation function, with a small negative slope (leaky ReLU). Furthermore, the $5^{th}$ convolutional layer can also have a 1×1 or 3×3 kernel.

The output signal 205 (which can be considered as processed information) of the block 200 of convolutional layers, which can be considered for example to be a matrix of 23×5 points/pixels in 64 channels (see 23×5, 64 Ch in FIG. 2) is then fed into a shared fully-connected layer 210, with again for example rectified-linear activations.

The result of the shared fully-connected layer 210, which can be considered to be a processed information 215 or signal is then fed into separated symbol identification branches 220a, 220b as well as a country identification branch 225. In FIG. 2, only 2 symbol identification branches 220a and 220b are disclosed for reasons of simplicity, but, as a person skilled in the art will easily understand, more such symbol identification branches can be implemented, preferably as many symbol identification branches as symbols are to be identified in the longest possible string 170 stamped on or implemented in the license plate 105. In FIG. 2, the symbol identification branch 220a represents an identification branch for the first symbol of the registration string 170 whereas the second identification branch 220b represents an identification branch for the eighth symbol of the registration string 170; the symbol identification branches between the branch 220a and the branch 220b. Thus, the configuration shown in FIG. 2 allows an identification of 8 symbols in the registration string 170. However, it has to be mentioned that the convolutional neural network 150 can have more or less than 8 symbol identification branches. However, the convolutional neural network is configured to cover a set of countries, and has as many symbol branches as the longest possible registration in any of the countries it knows. Anything shorter than that, either because a particular registration is short, or all registrations in one country are shorter, gets padded with spaces for example.

The processed information 215 for example is a signal having 2048 components. For example, as the signal or processed information 215 has 2048 components, also the shared fully-connected layer 210 can be considered to have 2048 nodes, each of which providing one of the components of the processed information 215 respectively the signal.

Each of the symbol identification branches 220a and 220b is separated from each other, such that for example no information from one branch can be transferred to another of the branches. Each of the branches 220a and 220b is configured for identifying one single symbol 155 of the number 170 of the license plate 105 at a respective position in the registration string 170. In order to accomplish this task, the symbol identification branches 220a and 220b each comprise a fully-connected layer 230 which accepts the processed information 215 and outputs a signal 235 having for example 256 components such that the fully-connected layers 230 can be considered to have 256 output nodes. The signal 235 of the symbol identification branches 220a and 220b is then fed into an output layer 240 of the branches 220a and 220b, which then outputs, for example via a soft-max function, the respective identified symbol 155 at the respective position in the registration string 170, which is analyzed by the respective symbol identification branch 220a and 220b. To be more specific, the identified symbol 155 is considered to be a set of predictions, how likely that this symbol is each one of the 37 options. The highest one is generally chosen as the answer, to be called the "identified symbol" 155 in this description, but other ways of treating the 37 numbers are possible.

The symbol 155 can be one of the predefined numbers of symbols, according to FIG. 2, for example 37 symbols, which represent the possible symbols at any position in the registration string 170. The number of 37 is obtained for example by the number of 10 digits, 26 alphabetical characters and one space symbol, which can be found in the respective position of the registration string 170.

In addition, the processed information 215 can be fed into said country identification branch 225, in order to identify a specific country, in which the license plate 105 is accredited. In the country identification branch 225 again at least one fully-connected layer 245 for the identification of the country is provided, which is fed by the processed information 215. The fully-connected layer 245 outputs for example a signal 250 having 128 components, which then is accepted by an output layer 255 for outputting a code, representing the country 160 in which the license plate 105 is accredited. To be more specific, the output is not directly a, sign or country marking, but a set of probabilities, one for each possible country. Again, generally the highest one will be picked and named to be the country 160 in this description, but also setting a threshold below which the system outputs a 'don't-know' answer instead is also possible. The output layer 255 for outputting the country 160 can, depending on the training of the convolutional neural network 150, be configured such that a predefined number $N_{countries}$ (denoted in FIG. 2 as $N_{count}$) can be identified.

Summarizing, the approach disclosed here for example as an embodiment of the present invention uses a single convolutional neural network 150, with multiple outputs in order to output the identified symbols 155 and optionally the code 160 indicating the country in which the license plate 105 was accredited. The convolutional neural network 150 is used to simultaneously read the number plate 105, wherever it appears within the crop, and determine its country of registration. The first fully connected layer is for example common, while the later ones are for example specialized to determine the character/symbol 155 at a particular position in the output string or the country of registration. Registrations which are shorter than the maximum number of characters/symbols 155 understood by the network 150 (somewhere between 7 and 10, depending on countries covered), are padded with spaces at the end for example. An additional output branch 225 is responsible for predicting the country, from the set of countries that a particular instance of the network has been trained for. It should be mentioned that convolutional layers like the layers of block 200 function as detectors of individual characters/symbols 155 at different sizes, wherever in the image 135 they appear. Fully connected layers like the layers 230 or 245 process the resulting heat-maps to extract a correctly ordered sequence. The shared fully connected layer like the layer 210 allows effective information exchange between the different position and/or country branches, respectively branches 220a, 220b or 225.

The network is for example trained using data augmentation techniques, to ensure consistently high recognition rates across different locations within the crop.

Avoiding the error-prone intermediate stage of character segmentation, like in the approach disclosed herein, greatly improves the accuracy of predicted reads, as well as removes the need for labeling character positions in the training data. This allows much greater quantities of training data to be easily obtained, further improving the accuracy of output.

Allowing the plate to be positioned anywhere within the input image, rather than fully filling it, avoids problems resulting from errors in plate localization (the immediately preceding step of the ANPR pipe-line). It also allows easy processing of two-line plates, which cannot be accommodated by networks whose input precisely matches the shape of single-line plates.

The holistic approach to both reading and country identification allows syntax rules to be implicitly embedded in the network, and produce the most likely output combination. Country identification can take into account all aspects of visual appearance, such as font, hyphenation marks, spacing of character groups, and any special symbols related to the issuing jurisdiction.

Figure 3:
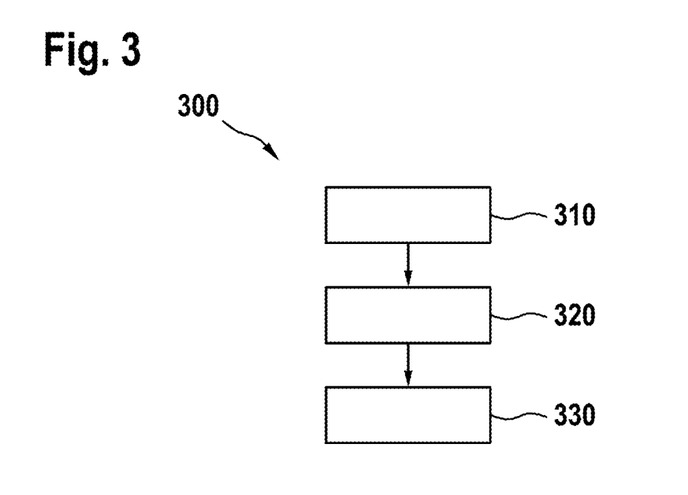
FIG. 3 is a flowchart of a method for recognizing a license plate of a vehicle according to an exemplary embodiment.

FIG. 3 shows a flowchart of a method 300 for recognizing a license plate of a vehicle according to an embodiment. The method 300 comprises the step 310 of reading-in an image of a surrounding of an optical sensor, the image originating from the optical sensor picturing at least said vehicle having a detectable license plate. Furthermore, the method 300 comprises a step 320 of analyzing the image using a convolutional neural network, the convolutional neural network having at least two separated symbol identification branches, each of the separated symbol identification branches being configured for identifying one of several symbols of the license plate and/or the convolutional neural network having a country identification branch being separated from the symbol identification branches, the country identification branch being configured for identifying the country having issued the license plate. Finally the method 300 comprises a step 330 of outputting the at least two identified symbols and/or the identified country in order to recognize the license plate of the vehicle.

Figure 4:
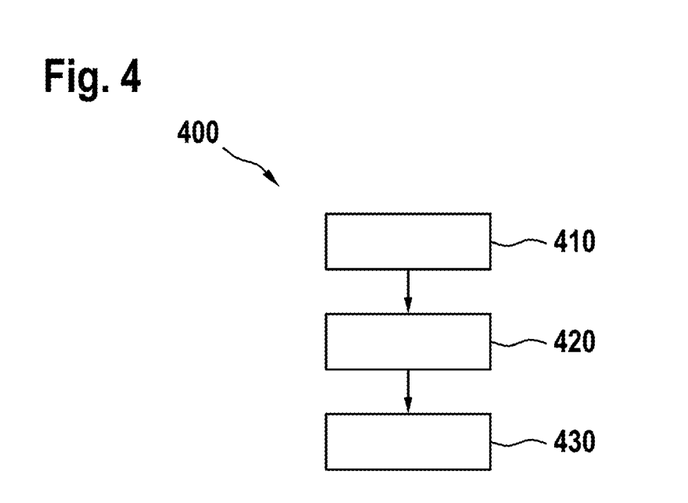
FIG. 4 is a flowchart of a method for training a convolutional neural network to be used in a method for recognizing a license plate of a vehicle.

FIG. 4 shows a flowchart of a method 400 for training a convolutional neural network to be used in a method for recognizing a license plate of a vehicle according to an embodiment. The method 400 comprises a step 410 of reading in an image of a surrounding of an optical sensor, the image originating from the optical sensor picturing at least the vehicle having a detectable license plate. Furthermore, the method 400 comprises a step 420 of providing a convolutional neural network, the convolutional neural network having at least two separated symbol identification branches, each of the separated symbol identification branches being configured for identifying one of several symbols of the license plate and/or the convolutional neural network having a country identification branch being separated from the symbol identification branches, the country identification branch being configured for identifying the country having issued the license plate. Finally the method 400 comprises a step 430 of training the convolutional neural network using the image read in.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for recognizing a license plate of a vehicle, the method comprising:
reading in an image of a surrounding of an optical sensor, the image originating from the optical sensor picturing at least the vehicle having a detectable license plate;
analyzing the image using a convolutional neural network, the convolutional neural network having at least two separated symbol identification branches, the at least two separated symbol identification branches including at least one fully connected layer and an output layer, each of the separated symbol identification branches being configured for identifying one of several symbols of the license plate and/or the convolutional neural network having a country identification branch being separated from the symbol identification branches, the country identification branch being configured for identifying the country having issued the license plate; and
outputting the at least two identified symbols and/or the identified country in order to recognize the license plate of the vehicle.

2. The method according to claim 1, wherein the output layer has a number of neurons being equivalent to a number of identifiable distinguishable types of symbols on the license plate, especially the output layer having 37 neurons.

3. The method according to claim 1, wherein, in the step of analyzing, a convolutional neural network is used, having the fully-connected layer as an input to the output layer in the symbol identification branches.

4. The method according to claim 1, wherein, in the step of analyzing, a convolutional neural network is used having at least three separated symbol identification branches, each of the separated symbol identification branches being configured for identifying one of several symbols of the license plate, and in the step of outputting, the at least three identified symbols are outputted in order to recognize the license plate of the vehicle.

5. The method according to claim 1, wherein, in the step of analyzing, a convolutional neural network is used, having a plurality of convolutional layers or three to twenty or five convolutional layers, the convolutional layers being arranged in series, the plurality of convolutional layers being used for processing the image in order to obtain processed information, and wherein the convolutional neural network is configured to feed the processed information into the separated symbol identification branches and/or the country identification branch.

6. The method according to claim 1, wherein, in the step of analyzing, a convolutional neural network is used, having at least one shared fully-connected layer as input to the separated symbol identification branches and/or the country identification branch.

7. A method for training a convolutional neural network to be used in a method for recognizing a license plate of a vehicle, the method comprising:

reading in an image of a surrounding of an optical sensor, the image picturing at least the vehicle having a detectable license plate;

providing a convolutional neural network, the convolutional neural network having at least two separated symbol identification branches, the at least two separated symbol identification branches including at least one fully connected layer and an output layer, each of the separated symbol identification branches being configured for identifying one of several symbols of the license plate and/or the convolutional neural network having a country identification branch being separated from the symbol identification branches, the country identification branch being configured for identifying the country having issued the license plate; and training the convolutional neural network using the image read in.

8. A non-transitory computer-readable medium storing a computer program thereon that, when executed by a computer, causes the computer to carry out the method according to claim 1.

9. An apparatus for recognizing a license plate of a vehicle, the apparatus comprising:

a reading-in-interface configured to read an image of a surrounding of an optical sensor, the image originating from the optical sensor picturing at least the vehicle having a detectable license plate;

an analyzing unit having a convolutional neural network, the analyzing unit configured to analyze the image using the convolutional neural network, wherein the convolutional neural network has at least two separated symbol identification branches, the at least two separated symbol identification branches including at least one fully connected layer and an output layer, wherein each of the separated symbol identification branches being configured for identifying one of several symbols of the license plate and/or the convolutional neural network having a country identification branch being separated from the symbol identification branches, the country identification branch being configured for identifying the country having issued the license plate; and an output unit configured to output the at least two identified symbols and/or the identified country in order to recognize the license plate of the vehicle.

* * * * *